(12) United States Patent
Kumagai et al.

(10) Patent No.: US 9,306,845 B2
(45) Date of Patent: Apr. 5, 2016

(54) COMMUNICATION SYSTEM AND NETWORK RELAY DEVICE

(71) Applicant: Hitachi Metals, Ltd., Minato-ku, Tokyo (JP)

(72) Inventors: Wataru Kumagai, Ichikawa (JP); Hiroshi Ishizaki, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 227 days.

(21) Appl. No.: 14/078,816

(22) Filed: Nov. 13, 2013

(65) Prior Publication Data

US 2014/0140346 A1 May 22, 2014

(30) Foreign Application Priority Data

Nov. 22, 2012 (JP) .................................. 2012-256824

(51) Int. Cl.
| | | |
|---|---|---|
| H04L 12/741 | (2013.01) | |
| H04L 12/709 | (2013.01) | |
| H04L 12/64 | (2006.01) | |
| H04L 12/46 | (2006.01) | |
| H04L 29/06 | (2006.01) | |

(52) U.S. Cl.
CPC ............ *H04L 45/74* (2013.01); *H04L 12/6418* (2013.01); *H04L 45/245* (2013.01); *H04L 12/4633* (2013.01); *H04L 69/22* (2013.01); *Y02B 60/33* (2013.01)

(58) Field of Classification Search
CPC .................................................. H04L 12/6418
USPC ........................ 370/219, 228, 256, 390, 392
See application file for complete search history.

(56) References Cited

U.S. PATENT DOCUMENTS

| | | | | | |
|---|---|---|---|---|---|
| 6,141,344 | A | * | 10/2000 | DeLong ................ | H04L 45/742 370/360 |
| 6,275,919 | B1 | * | 8/2001 | Johnson ............ | G06F 17/30949 707/E17.036 |
| 6,735,198 | B1 | * | 5/2004 | Edsall ..................... | H04L 45/54 370/389 |
| 8,898,431 | B2 | * | 11/2014 | Hewson ........................ | 711/122 |
| 2001/0043614 | A1 | * | 11/2001 | Viswanadham ...... | H04L 49/602 370/469 |
| 2002/0101875 | A1 | * | 8/2002 | Lui ....................... | H04L 12/462 370/402 |
| 2002/0184529 | A1 | * | 12/2002 | Foster ................... | H04L 49/357 726/4 |
| 2008/0008182 | A1 | * | 1/2008 | Deng ................... | H04L 12/4625 370/392 |
| 2008/0068985 | A1 | * | 3/2008 | Mieno ..................... | H04L 12/66 370/217 |
| 2010/0039960 | A1 | * | 2/2010 | Sugaya ............. | H04W 72/1278 370/255 |

(Continued)

FOREIGN PATENT DOCUMENTS

JP          2008-78893 A        4/2008

*Primary Examiner* — Raj Jain
*Assistant Examiner* — Andrew C Lee
(74) *Attorney, Agent, or Firm* — Crowell & Moring LLP (57) ABSTRACT

An address table can be easily shared (synchronized) between two switching devices for which multi-chassis link aggregation is set. When a destination port of a frame received at a port P2 is a port P1, one of the two switching devices for which the multi-chassis link aggregation is set creates a bridging frame containing a transmission source address contained in the flame and an identifier of the port which has received, and transfers the bridging frame from a bridging port. When the other of the two switching devices receives the bridging frame, the other of the two switching devices detects the identifier of the port which has received and the transmission source address from the frame, and updates an address table of its own based on the identifier, the transmission source address, and a link table of its own.

4 Claims, 9 Drawing Sheets

(56) References Cited

U.S. PATENT DOCUMENTS

| | | | | |
|---|---|---|---|---|
| 2010/0271980 | A1* | 10/2010 | Kini | H04L 12/462 370/256 |
| 2012/0033678 | A1* | 2/2012 | Page | H04L 45/28 370/401 |
| 2012/0182866 | A1* | 7/2012 | Vinayagam | H04L 45/245 370/228 |
| 2013/0058340 | A1* | 3/2013 | Lambeth | H04L 12/4633 370/392 |
| 2013/0242992 | A1* | 9/2013 | Basso | H04L 45/16 370/390 |
| 2014/0169222 | A1* | 6/2014 | Cohen | H04W 84/22 370/255 |
| 2014/0376373 | A1* | 12/2014 | Deshpande | H04L 47/12 370/235 |
| 2015/0023358 | A1* | 1/2015 | Tsirkin | H04L 41/0813 370/401 |

* cited by examiner

COMMUNICATION SYSTEM AND NETWORK RELAY DEVICE

CROSS-REFERENCE TO RELATED APPLICATION

The present application claims priority from Japanese Patent Application No. 2012-256824 filed on Nov. 22, 2012, the content of which is hereby incorporated by reference into this application.

TECHNICAL FIELD OF THE INVENTION

The present invention relates to a communication system and a network relay device. For example, the present invention relates to a network relay device in which link aggregation is set across two devices and relates to a communication system including the network relay device.

BACKGROUND OF THE INVENTION

For example, Japanese Patent Application Laid-Open Publication No. 2008-78893 (Patent Document 1) describes a configuration provided with a pair of middle-order switching devices connected to each other by a redundancy port, and a low-order switching device and a high-order switching device connected in a state that link aggregation is set to ports having the same port number of the pair of the middle-order switching devices.

SUMMARY OF THE INVENTION

For example, as described in the Patent Document 1, a system in which two ports in one switching device [A] and respective ports in two switching devices [B] are connected to each other by using communication lines has been known as a redundancy system. At this time, in the one single switching device [A], the link aggregation is set for the two ports of its own. Also in the two switching devices [B], the link aggregation is set for each port across the respective devices.

In this redundancy system, as different from general link aggregation which is physically set for one switching device, the link aggregation is physically set across the two switching devices. Therefore, in addition to such effects as redundancy against a failure in a communication line and expansion of a communication bandwidth which are obtained by the general link aggregation, redundancy against a failure in the switching device can be achieved. Such a redundancy system that the link aggregation is set across the two switching devices is referred to as a multi-chassis link aggregation in this specification.

In the two switching devices [B] for which the multi-chassis link aggregation is set, the ports each across between the above-described respective devices are required to be logically (virtually) functioned as one port when viewed from the one switching device [A]. Moreover, these two switching devices [B] are required to be logically (virtually) functioned as one switching device when viewed from the one switching device [A]. Therefore, in these two switching devices [B], a mechanism for sharing (synchronizing) an address table indicating a relation between the port and a MAC (Media Access Control) address existing ahead of the port is required.

As the mechanism for sharing (synchronizing) the address table, for example, a system is proposed in which a communication line is provided between the two switching devices [B] so that information of the address table is exchanged therebetween via the communication line as needed. However, in such a system, a complicated process is required due to the exchange of the information of the address table, and besides, a wide communication bandwidth is sometimes required for the communication line between the two switching devices [B]. More particularly, when each of the two switching devices [B] is a box-type switching device, various problems might occur in the ensuring of this communication bandwidth, timing of the share (synchronization) of the address table, processing time required for the share (synchronization), and others.

Accordingly, another system is considered so that, for example, the transferring processing is performed from one of the two switching devices [B] to the other when a method of transferring a frame received by one of the two switching devices [B] is a non-unicast (broadcast or multi-cast) operation. That is, when one of the two switching devices [B] receives a frame that has been previously set as the non-unicast operation or receives a frame with an unknown destination MAC address, the received frame is flooded so as to include the other of the two switching devices [B].

This system, as its premise, utilizes such an actual condition in, for example, a normal packet communication, that an ARP (Address Resolution Protocol) request to be the frame of the non-unicast operation is issued first from a terminal of a transmission source, and then, the communication is performed. For example, when one of the two switching devices [B] receives the ARP request from a low-order terminal at a certain degree of frequency, or receives the frame with the unknown destination MAC address from the terminal at a certain degree of frequency, a frame containing the MAC address of the corresponding terminal is transferred also to the other of the two switching devices [B]. As a result, the MAC address of the corresponding terminal can be acquired in both of the two switching devices [B], so that the address table can be easily shared (synchronized) therebetween.

However, in some cases, one of the two switching devices [B] does not receive the ARP request or the frame with the unknown destination MAC address for a certain period of time. In this case, in the two switching devices [B], a not-shared (not-synchronized) MAC address exists in the address table for a certain period of time. For example, in this period, when either of the switching devices [B] not containing this MAC address in the address table frequently receives a frame with this MAC address as the destination MAC address, the flooding operation occurs each time. As a result, the communication bandwidth is congested.

The present invention has been made in consideration of such a problem, and one of preferred aims of the present invention is to easily achieve share (synchronization) of an address table in two network relay devices (switching devices) for which multi-chassis link aggregations is set. Moreover, other preferred aim of the same is to achieve a communication system provided with the network relay devices. The above and other preferred aims and novel characteristics of the present invention will be apparent from the description of the present specification and the accompanying drawings.

A summary of a typical embodiment of the inventions disclosed in the present application will be briefly described as follows.

A communication system according to the present embodiment is provided with first to third switching devices. The first and second switching devices each has a plurality of ports including a bridging port and a first port, and are connected to each other by a communication line via the bridging port. The third switching device is connected to the first ports of the first and second switching devices via different communication lines from each other, and link aggregation is set for ports to be connection sources of the communication lines. Here, each of the first and second switching devices has an address table indicating a relation between the plurality of ports of its own and addresses existing ahead of the respective ports and has a link table by which the first ports of the first and second switching devices are logically functioned as one port. When the first switching device receives a frame at the first port, the first switching device creates a bridging frame containing a transmission source address contained in the received frame and an identifier of the port which has received, and transfers the bridging frame from the bridging port. When the second switching device receives the bridging frame at the bridging port, the second switching device detects the identifier of the port which has received and the transmission source address from the bridging frame, and updates the address table of its own based on the identifier of the port which has received and the transmission source address.

When the effects obtained by the typical embodiment are briefly described, share (synchronization) of the address table can be easily achieved between the two network relay devices for which the multi-chassis link aggregation is set.

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate or similar shapes and the like are included therein unless otherwise stated or except the case where it is conceivable that they are apparently excluded in principle. The same goes for the numerical value and the range described above.

Hereinafter, embodiments of the present invention will be described in detail based on the drawings. Note that the same components are denoted by the same reference symbols throughout all drawings for describing the embodiments, and the repetitive description thereof will be omitted.

(First Embodiment)

<<Schematic Configuration of Communication System>>

Figure 1:
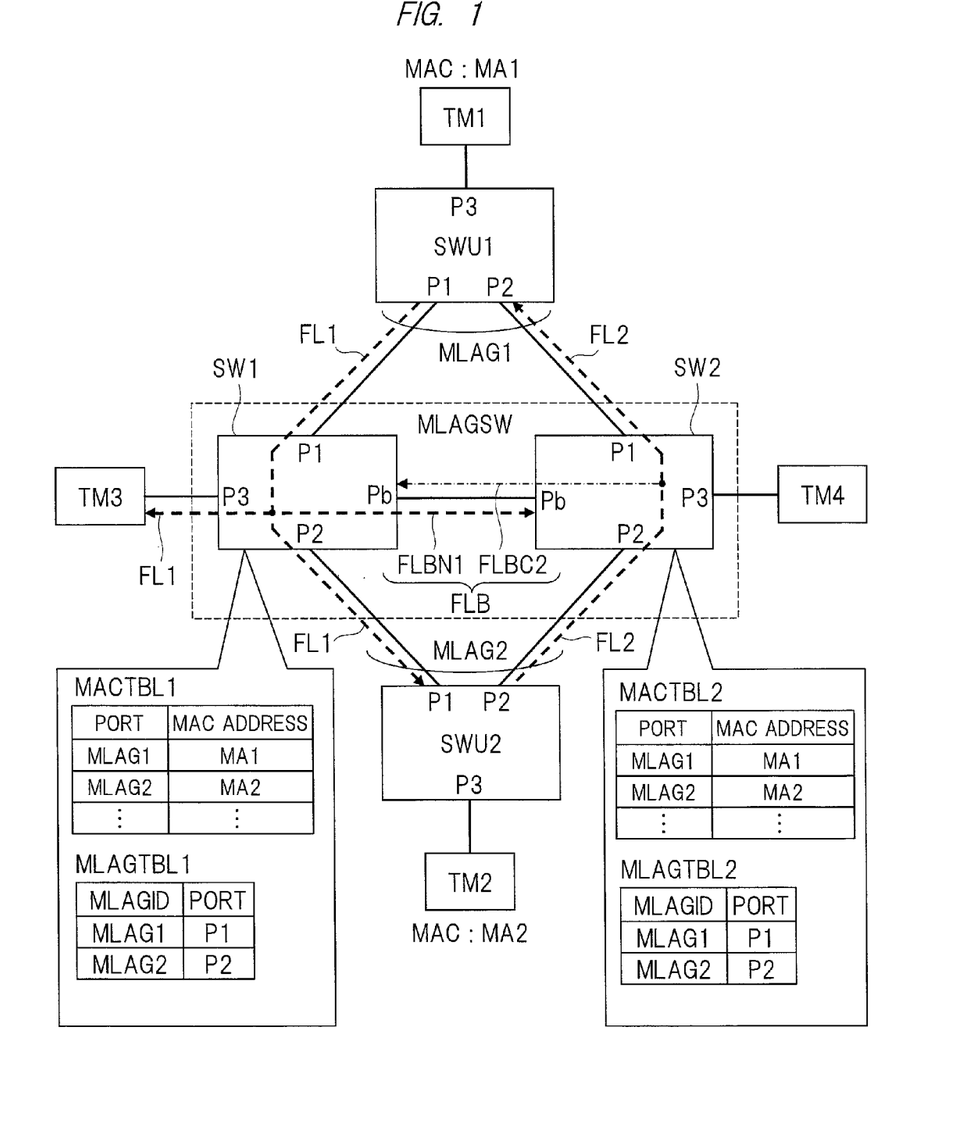
FIG. 1 is a schematic diagram illustrating a configuration example and an operational example in a communication system according to a first embodiment of the present invention.
Figure 2:
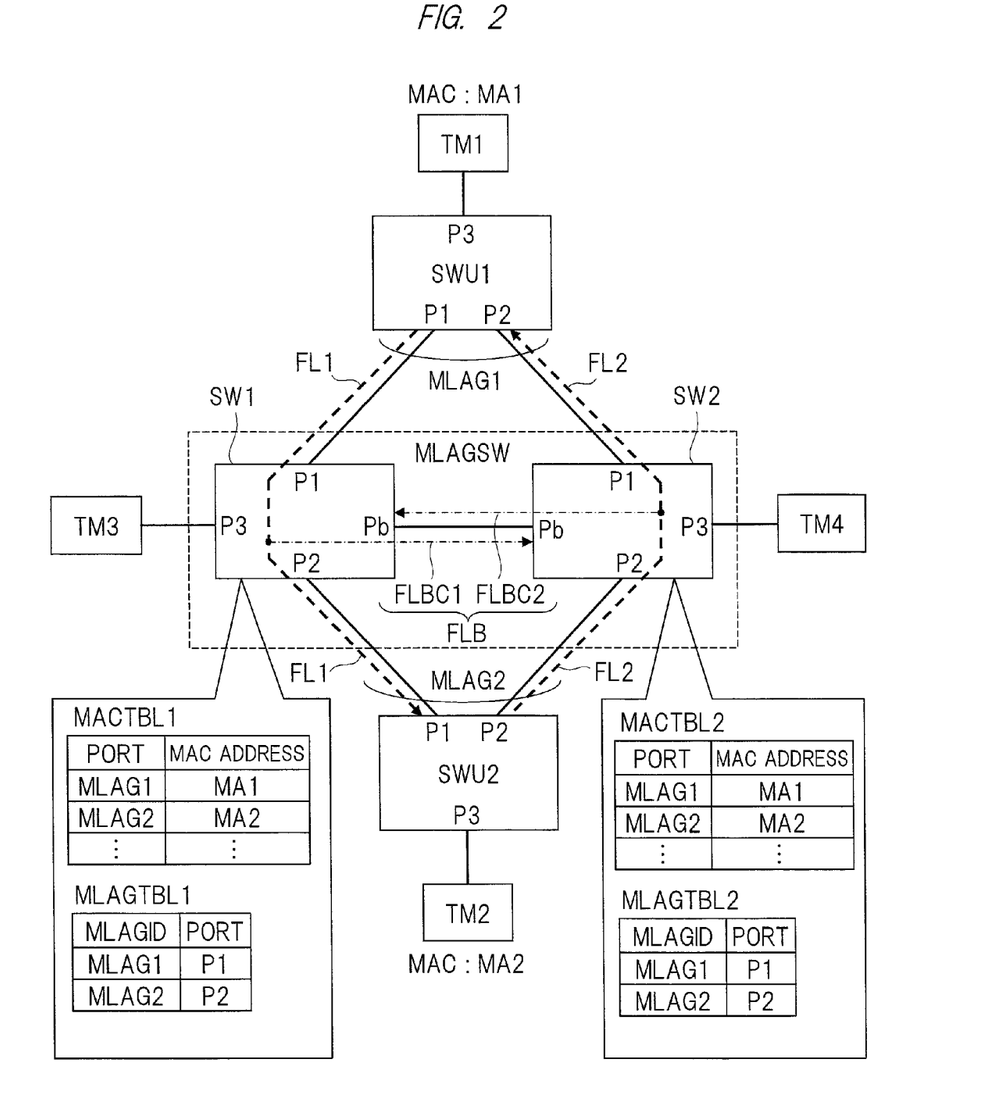
FIG. 2 is a diagram for supplementing the operational example of FIG. 1.

FIG. 1 is a schematic diagram that illustrates a configuration example and an operational example in a communication system according to a first embodiment of the present invention. FIG. 2 is a diagram for supplementing the operational example of FIG. 1. The communication system illustrated in FIG. 1 is provided with two switching devices (network relay devices) SW1 and SW2 for which multi-chassis link aggregation is set, and a plurality of (here, two) switching devices SWU1 and SWU2. In the present specification, the two switching devices SW1 and SW2 for which the multi-chassis link aggregation is set are generally referred to as a multi-chassis link aggregation device MLAGSW. Each of the SW1 and SW2 is achieved by a box-type switching device (network relay device).

Each of the switching devices (first and second switching devices) SW1 and SW2 is provided with a plurality of (here, three) ports P1 to P3, and a bridging port Pb. The SW1 and SW2 are connected to each other via the Pb by using a communication line (bridging communication line). Each of the switching devices SWU1 and SWU2 includes the three ports P1 to P3. The P1 and P2 in the switching device (third switching device) SWU1 are connected to the ports (first ports) P1 of the SW1 and SW2 via different communication lines from each other, and the link aggregation (multi-chassis link aggregations) is set for the P1 and P2 to be the connection sources of the corresponding communication lines. The P1 and P2 in the SWU2 are connected to the ports P2 of the SW1 and SW2 via different communication lines from each other, and the link aggregation (multi-chassis link aggregation) is set for the P1 and P2 to be the connection sources of the corresponding communication lines.

In the present specification, the ports for which this multi-chassis link aggregation is set are referred to as a multi-chassis link aggregation group MLAG. In the switching device SWU1, an MLAG1 is set for the ports P1 and P2 of its own. In the switching device SWU2, an MLAG2 is set for the ports P1 and P2 of its own. The multi-chassis link aggregation device MLAGSW sets the MLAG1 for the ports P1 of the switching devices SW1 and SW2 in accordance with the setting of the MLAG1 in the SWU1 so that the corresponding two ports P1 are logically (virtually) functioned as one port. Similarly, the MLAGSW sets the MLAG2 for the ports P2 of the switching devices SW1 and SW2 in accordance with the setting of the MLAG2 in the SWU2 so that the corresponding two ports P2 are logically (virtually) functioned as one port.

Moreover, as one example in FIG. 1, a terminal TM1 having an MAC address MA1 is connected to the port P3 of the switching device SWU1, and a terminal TM2 having an MAC address MA2 is connected to the port P3 of the switching device SWU2. Further, a terminal TM3 is connected to the port P3 of the switching device SW1, and a terminal TM4 is connected to the port P3 of the switching device SW2.

<<Schematic Configuration of Communication System (as Premise) and Problem>>

Figure 8:
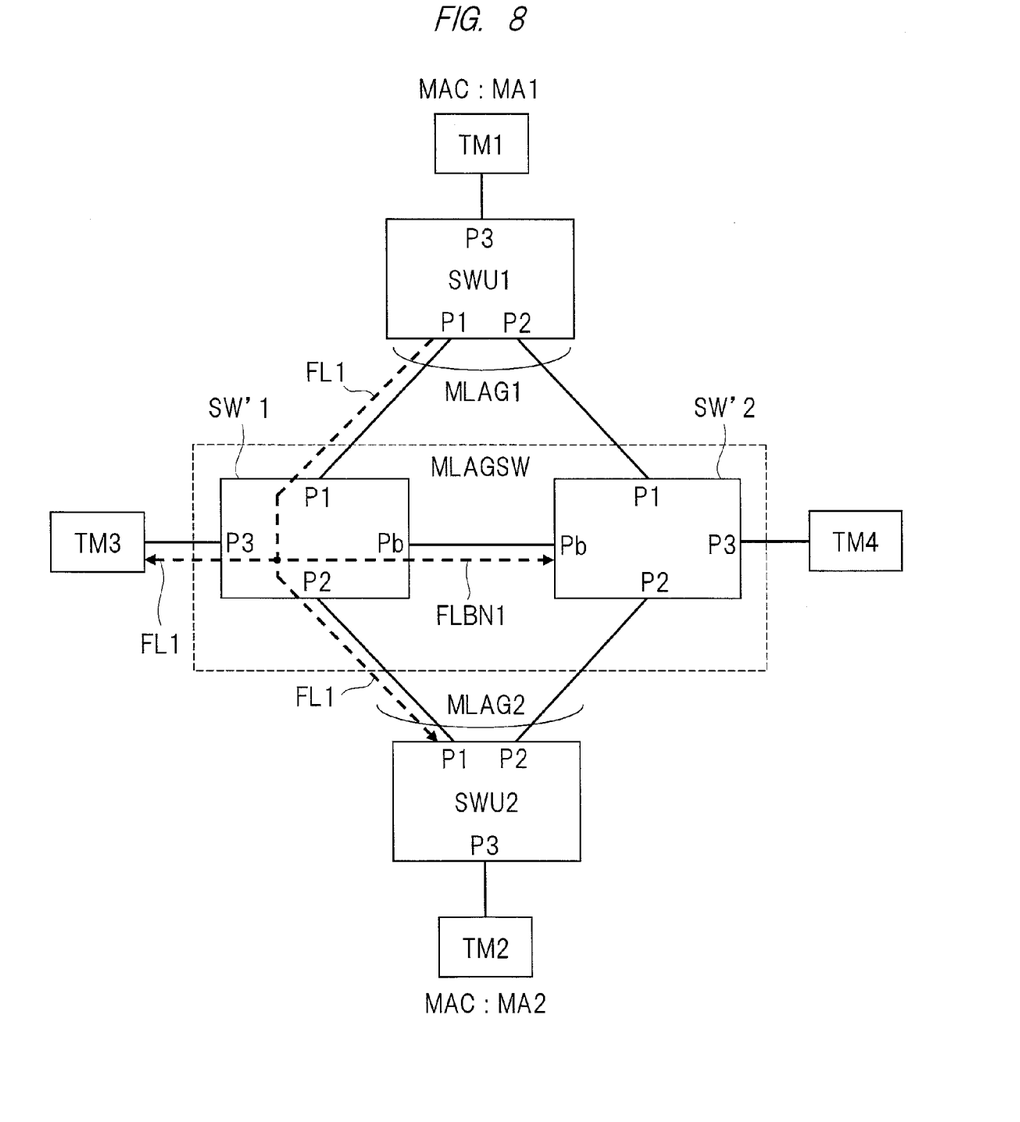
FIG. 8 is a schematic diagram illustrating one example of a configuration and an operation in a communication system that has been studied as a premise of the present invention.
Figure 9:
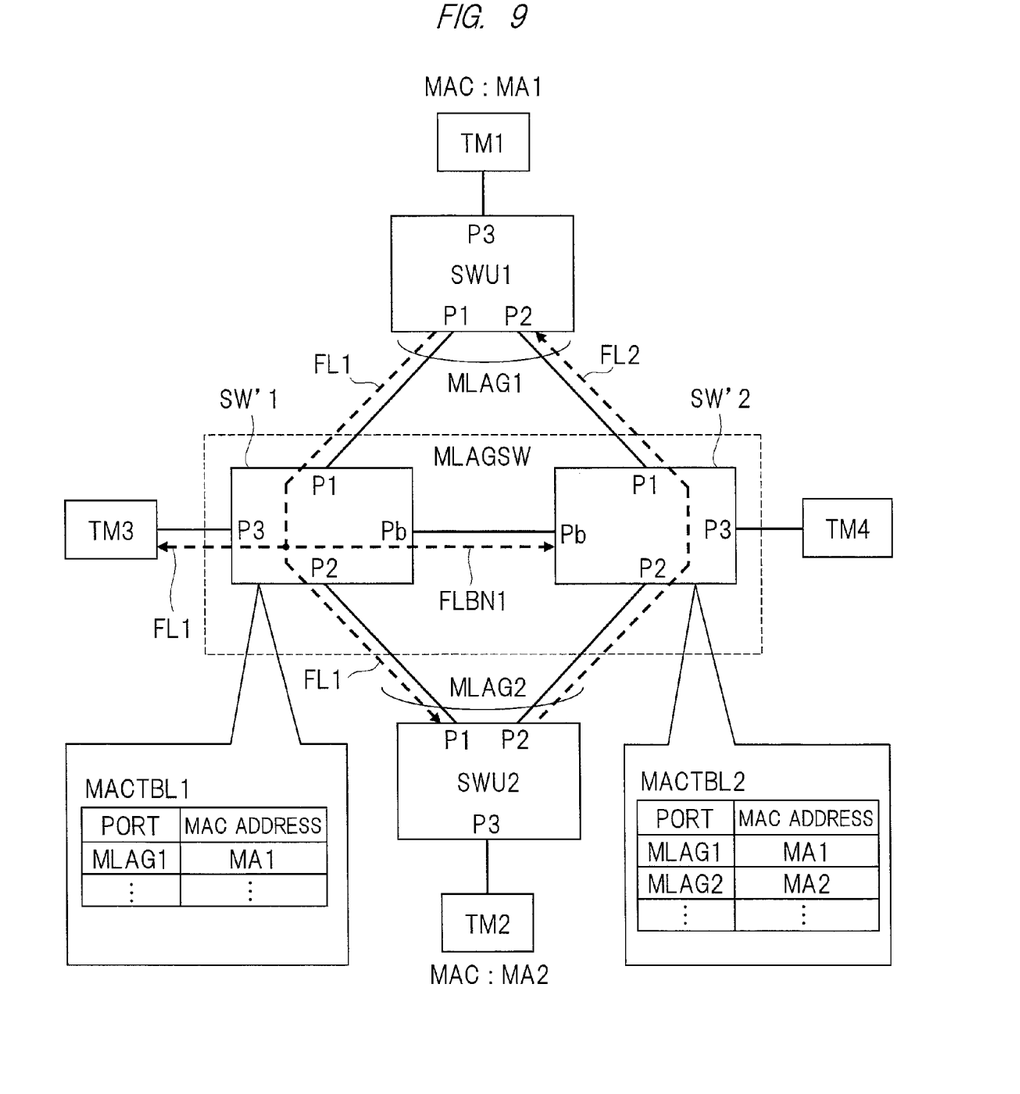
FIG. 9 is an explanatory diagram illustrating one example of a problem in the communication system of FIG. 8.

This section will explain one example of an operation of a communication system studied as a premise for the communication system of FIG. 1 as well as a specific problem caused when the operation is used. FIG. 8 is a schematic diagram illustrating one example of a configuration and an operation in the communication system studied as the premise of the present invention. FIG. 9 is an explanatory diagram illustrating one example of the problem of the communication system of FIG. 8. The communication system of FIG. 8 has a configuration in which the switching devices SW1 and SW2 configuring the multi-chassis link aggregation device MLAGSW in the communication system of FIG. 1 are replaced by switching devices SW'1 and SW'2.

In the multi-chassis link aggregation device MLAGSW, it is required between the two switching devices SW'1 and SW'2 to share (synchronize) the address table indicating the relation between each port and the MAC address existing ahead of each port. Accordingly, in FIG. 8, the SW'1 and the SW'2 share (synchronize) the address table therebetween by utilizing the flooding operation. More specifically, for example, the SW'1 receives a frame FL1 transmitted from the terminal TM1 via the switching device SWU1, and floods the frame from the port (P2, P3, or Pb) including the bridging port Pb except for the port which has received in a case that a method of transferring this is the non-unicast (broadcast or multi-cast) operation. The switching device SW'2 receives a frame FLBN1 created by this flooding operation at the Pb. In this manner, an MAC address MA1 of the TM1 to be a transmission source MAC address can be obtained in both of the SW'1 and the SW'2, so that the address table can be easily shared (synchronized) therebetween.

Such a flooding operation occurs in cases, for example, that the terminal TM1 transmits an ARP (Address Resolution Protocol) request to be a frame of the non-unicast operation, or that, when the switching device SW'1 receives the frame FL1, the destination MAC address contained in the frame FL1 does not exist in the address table of the SW'1. However, for example, as illustrated in FIG. 9, one (here, the SW'2) of the two switching devices SW'1 and SW'2 do not receive a frame having an unknown destination MAC address and the ARP request for a certain period of time in some cases.

In the example of FIG. 9, the frame FL1 directed from the terminal TM1 toward the terminal TM2 is received by the switching device SW'1, and a frame FL2 directed from the terminal TM2 toward the terminal TM1 is received by the switching device SW'2. At this time, when the switching device SWU1 receives a frame from the TM1, the switching device SWU1 selects either one (here, the port 1) of the ports P1 and P2 for which a multi-chassis link aggregation group MLAG1 has been set, based on a predetermined rule, and transfers the frame. Similarly, when the switching device SWU2 receives a frame from the TM2, the switching device SWU2 also selects either one (here, the port 2) of the ports P1 and P2 for which a multi-chassis link aggregation group MLAG2 has been set, based on a predetermined rule, and transfers the frame.

As the predetermined rule, for example, a method of performing a hashing operation or others by using any one or a plurality of the transmission source MAC address, the destination MAC address, a transmission source IP (Internet Protocol) address, and a destination IP address is cited. However, the predetermined rule can be appropriately determined for each of the switching devices SWUT and SWU2. As a result, as illustrated in FIG. 9, the frame FL1 directed from the terminal TM1 toward the terminal TM2 and the frame FL2 directed in a direction reversed thereto are different to be transferred through the switching devices SW'1 and SW'2 inside the multi-chassis link aggregation device MLAGSW in some cases.

In the case of FIG. 9, when the switching device SW'1 receives the frame FL1, the switching device SW'1 registers the transmission source MAC address MA1 contained in the FL1 into the address table MACTBL1 of its own. However, the destination MAC address (here, the MA2) contained in the FL1 is not registered in the MACTBL1, and therefore, the SW'1 transfers the frame by the flooding operation from the port (P2, P3, or Pb) except for the port which has received. The switching device SW'2 receives a frame FLBN1 created by this flooding operation at the bridging port Pb, and registers the transmission source MAC address MA1 contained in the corresponding frame into an address table MACTBL2 of its own. Moreover, when the SW'2 receives the frame FL2, the SW'2 registers a transmission source MAC address MA2 contained in the frame FL2 into the MACTBL2. At this time, as different from the case of the SW'1, the destination MAC address (here, the MA1) contained in the FL2 is registered into the MACTBL2, and therefore, the SW'2 transfers the corresponding frame to the switching device SWU1 by not the flooding operation but the unicast operation.

When the communication as illustrated in FIG. 9 is continuously performed for a certain period of time, the switching device SW'2 continuously acquires the MAC address MA1 based on the frame FLBN1 transmitted from the switching device SW'1, and therefore, the flooding operation is not performed for this period. Therefore, the SW'1 cannot acquire the MAC address MA2 for this period. As a result, during this period, the SW'1 performs the flooding operation each time of the reception of the frame FL1. By this flooding operation, the communication bandwidth is congested in each communication line around the SW'1.

<<Schematic Operation of Communication System>>

Accordingly, in the communication system illustrated in FIG. 1, as similar to the case of FIG. 9, the switching device SW1 transfers first the frame FL1 containing the transmission source MAC address MA1 and the destination MAC address MA2 received at the port P1 by the flooding operation from the port (P2, P3 or Pb) except for the port which has received. The switching device SW2 acquires the MA1 based on a bridging frame FLB (FLBN1) transferred from the bridging port Pb, and therefore, the switching device SW2 transfers the frame FL2 containing the transmission source MAC address MA2 and the destination MAC address MA1 received at the port 2, from the port P1 by the unicast operation. At this time, as different from the case of FIG. 9, the SW2 creates a bridging frame FLB (FLBC2) even in a case that the method of transferring the FL2 is the unicast operation with taking the port P1 as the destination port, and transfers it from the Pb toward the SW1.

As a result, the switching device SW1 acquires the MAC address MA2 based on the bridging frame FLB (FLBC2) transferred from the bridging port Pb, and therefore, it can transfer the frame FL1 by not the flooding operation but the unicast operation from the port P2. Then, as illustrated in FIG. 2, as similar to the case of the switching device SW2, the SW1 creates the bridging frame FLB (FLBC1) even in the case that the method of transferring the FL1 is the unicast operation with taking the port P2 as the destination port, and transfers it from the Pb toward the SW2. In this case, the address tables MACTBL1 and MACTBL2 are shared (synchronized) each time of the reception of the FL1 by the SW1 and each time of the reception of the FL2 by the SW2, so that the MAC addresses MA1 and MA2 in the respective tables are not deleted by aging. Therefore, in the SW1 and SW2, the flooding operation as illustrated in FIG. 9 does not occur, so that the communication bandwidth can be sufficiently secured.

As seen from the above-described operation examples, the first switching device (for example, SW1) configuring the MLAGSW creates the bridging frame (FLB) regardless of the method of transferring the frame (FL1) received at the first port (P1), either the unicast or the non-unicast operation. In other words, when the first switching device (such as the SW1) receives the frame (FL1) at the first port (P1), the first switching device creates the bridging frame (FLB), and transfers it from the bridging port (Pb).

On the other hand, when the second switching device (such as the SW2) configuring the MLAGSW receives the bridging frame (FLB) at the bridging port (Pb), the second switching device updates the address table (MACTBL2) of its own based on the bridging frame (FLB) or others, although the detailed method thereof will be described later. Note that this explanation has described the operational example in the case that the switching device SW1 performs the transferring process by the non-unicast and the unicast operation while the switching device SW2 performs the transferring process by the unicast operation. However, obviously, there is another case that the switching device SW2 performs the transferring process by the non-unicast and the unicast operation while the switching device SW1 performs the transferring process by the unicast operation. That is, the above-described operations of the first switching device can be similarly applied to the second switching device, and the above-described operations of the second switching device can be similarly applied to the first switching device.

Next, the details of the bridging frame FLB and a specific updating method for the address tables MACTBL1 and MACTBL2 will be explained. As illustrated in FIG. 1, one switching device SW1 configuring the MLAGSW is provided with the address table MACTBL1 and a link table MLAGTBL1, and the other switching device SW2 configuring the MLAGSW is also provided with the address table MACTBL2 and a link table MLAGTBL2.

The link tables MLAGTBL1 and MLAGTBL2 are tables by which the ports P1 (first ports) P1 of the switching devices SW1 and SW2 are logically functioned as one port and by which the ports P2 of the SW1 and SW2 are logically functioned as one port. The MLAGTBL1 and MLAGTBL2 indicate that the multi-chassis link aggregation group MLAG1 is set for the ports P1 of the SW1 and the SW2 and that the multi-chassis link aggregation group MLAG2 is set for the ports P2 of the SW1 and the SW2. The link tables are created by, for example, previously specifying the MLAG1 and the MLAG2 by a user.

Each of the address tables MACTBL1 and MACTBL2 is a table indicating a relation between a plurality of ports owned by itself and addresses (MAC addresses) existing ahead of the respective ports. Here, in the MACTBL1 and the MACTBL2, the ports for which the multi-chassis link aggregation groups MLAG1 and MLAG2 have been set are registered as the ports of the multi-chassis link aggregation groups MLAG. For example, the MACTBL1 inside the switching device SW1 indicates that the address (MAC address) MA1 exists ahead of the port of the MLAG1, and this means that the MA1 exists ahead of the port P1 of the SW1 based on the link table MLAGTBL1.

In FIG. 1, when the method of transferring the frame (FL1) received at the first port (P1) is the non-unicast operation (here, the non-unicast operation with containing the second port (P2) as the destination port), the switching device (first switching device) SW1 creates a relay-use bridging frame FLB (FLBN1). Moreover, in FIG. 2, when the method of transferring the frame (FL1) received at the first port (P1) is the unicast operation (here, the unicast operation with taking the second port (P2) as the destination port), the switching device (first switching device) SW1 creates a learning-use bridging frame FLB (FLBC1).

Figure 3:
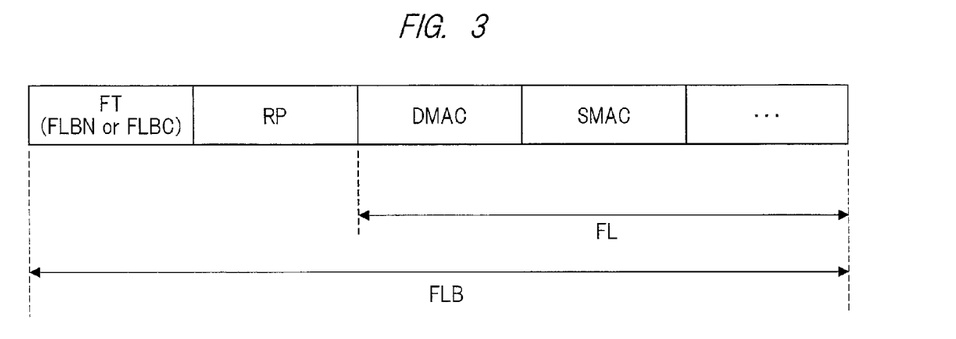
FIG. 3 is a schematic diagram illustrating a configuration example of a bridging frame in FIGS. 1 and 2.

FIG. 3 is a schematic diagram illustrating a configuration example of the bridging frame FLB in FIGS. 1 and 2. As illustrated in FIG. 3, for example, the frame FL (FL1) received at the first port (P1) by the switching device SW1 contains a transmission source address (transmission source MAC address) SMAC and a destination address (destination MAC address) DMAC. The bridging frame FLB has a configuration in which, for example, an identifier RP of the port which has received and an identifier FT for a frame type are added to the corresponding FL. When the FT is a first identifier that means to be used for learning, the FLB is the learning-use bridging frame FLBC, while, when the FT is a second identifier that means to be used for relay, the FLB is the relay-use bridging frame FLBN.

In FIG. 1, when the switching device SW1 creates the relay-use bridging frame FLBN (FLBN1), for example, the identifier RP of the port which has received is set as the multi-chassis link aggregation group MLAG1, and the identifier FT for the frame type is set as the second identifier. The switching device SW2 which has received the FLB (FLBN1) detects the identifier RP (here, the MLAG1) of the port which has received, the transmission source address (transmission source MAC address) SMAC (here, the MA1), and the second identifier from the FLB (FLBN1). Then, the SW2 updates the address table MACTBL2 based on the RP (MLAG1) and the SMAC (MA1). That is, the SW2 registers the MA1 in allocation not to the bridging port Pb but to the port of the multi-chassis link aggregation group MLAG1. In other words, the SW2 registers the MA1 so that the MA1 exists ahead of the port P1 of its own.

Further, since the switching device SW2 has detected the second identifier as the identifier FT for the frame type, the switching device SW2 transfers the relay-use bridging frame FLB (FLBN1) from a predetermined port. At this time, for example, when the SW2 has detected the second identifier as the FT, the transferring process is performed so that the predetermined port is determined as the port P3 in the example of FIG. 1 without transferring from the MLAG port in addition to the port (Pb) which has actually received. Note that, when the SW2 transfers the frame from the port P3, the transferring process is performed after the frame is restored to a normal frame (that is, to the frame FL from which the RP and the FT have been deleted in FIG. 3).

On the other hand, in FIG. 2, when the switching device SW1 creates the leaning-use bridging frame FLB (FLBC1), for example, the identifier RP of the port which has received is set as the multi-chassis link aggregation group MLAG1, and the identifier FT for the frame type is set as the first identifier. As similar to the case of FIG. 1, the switching device SW2 which has received the FLB (FLBC1) detects the identifier RP (here, the MLAG1) of the port which has received, the transmission source address (transmission source MAC address) SMAC (here, the MA1), and the first identifier from the FLB (FLBC1). Then, the SW2 updates the address table MACTBL2 based on the RP (MLAG1) and the SMAC (MA1).

However, since the switching device SW2 detects the first identifier as the identifier FT for the frame type as different from the above-described case of FIG. 1, it is not required to perform the transferring process after that, and therefore, the learning-use bridging frame FLB (FLBC1) is discarded. Therefore, regarding the learning-use bridging frame FLB (FLBC1), it is not always required to contain the entire normal frame FL as illustrated in FIG. 3, but only required to provide a configuration containing the transmission source MAC address SMAC and the identifier RP of the port which has received in order to update the address table MACTBL2.

Moreover, in FIG. 2, in the case that the method of transferring the frame (FL1) received at the first port (P1) is the unicast operation, the switching device (first switching device) SW1 more desirably creates the learning-use bridging frame FLB (FLBC1) in consideration of a communication bandwidth of the bridging-use port Pb. That is, in the SW1, when a limited range of the communication bandwidth previously set for the Pb is satisfied by using a so-called QoS (Quality of Service) function, it is desired to provide a configuration so as to transfer the FLB (FLBC1) from the Pb. For the relay-use bridging frame, note that such a limited range of the communication bandwidth is not set.

For example, FIG. 2 illustrates the example in which each of the switching devices SW1 and SW2 is provided with the three ports P1 to P3. However, practically, they are provided with more ports in some cases, and a switching device and a terminal are appropriately connected to the corresponding port. In this case, the SW1 and SW2 relay a frame received from these many switching devices or terminals and a frame transmitted toward these many switching devices or terminals. As a result, the number of frames to be transferred on the communication line (bridging communication line) between the bridging ports Pb of the SW1 and SW2 tends to increase, and therefore, a wide communication bandwidth is required for the bridging communication line. In order to sufficiently ensure the communication bandwidth for this bridging communication line, it is desired to reduce the number of frames to be transferred on the bridging communication line as small as possible. Accordingly, it is effective to limit the communication bandwidth as described above.

If the communication bandwidth is limited, the number of frames exceeding the limited range is discarded. However, practically, a frame (learning-use bridging frames FLB (FLBC1)) that is not discarded is obtained to a certain degree of frequency. Therefore, if such a degree of frequency that the FLB (FLBC1) can reach at a high possibility within the aging period of the address table is ensured, such a problem of the flooding as illustrated in FIG. 9 can be solved. That is, it is desired to set the limited range of the communication bandwidth to such a degree as to ensure a frequency suitable for the aging period of the address table. Note that one bridging communication line is used in FIGS. 1 and 2. However, practically, the wide communication bandwidth is required, and therefore, a plurality of bridging communication lines and bridging ports Pb are provided, and the link aggregation is set for the plurality of Pb.

As described above, by using the communication system and the network relay device of the present first embodiment, typically in two network relay devices (switching devices) for which the multi-chassis link aggregation is set, the address table can be easily shared (synchronized) therebetween. That is, as a comparative example, by providing not a system in which the information of the address table is exchanged each time between the two switching devices by using a software process but a system in which the bridging frame is used as described above, the processes can be simplified, so that the address table can be easily shared (synchronized).

Moreover, since the process is simplified, the share (synchronization) of the address table can be performed at a high speed by using a hardware process. In this case, it a period in which of the address tables mismatch between the two switching devices can be shortened. Moreover, the frequent occurrences of the flooding as illustrated in FIG. 9 can be prevented by the share (synchronization) of the address table, and therefore, the communication bandwidth can be sufficiently ensured. Further, as described above, by limiting the communication bandwidth of the bridging port, the communication bandwidth can be further ensured.

(Second Embodiment)

<<Schematic Configuration and Schematic Operation of Communication System (Applied Example)>>

Figure 4:
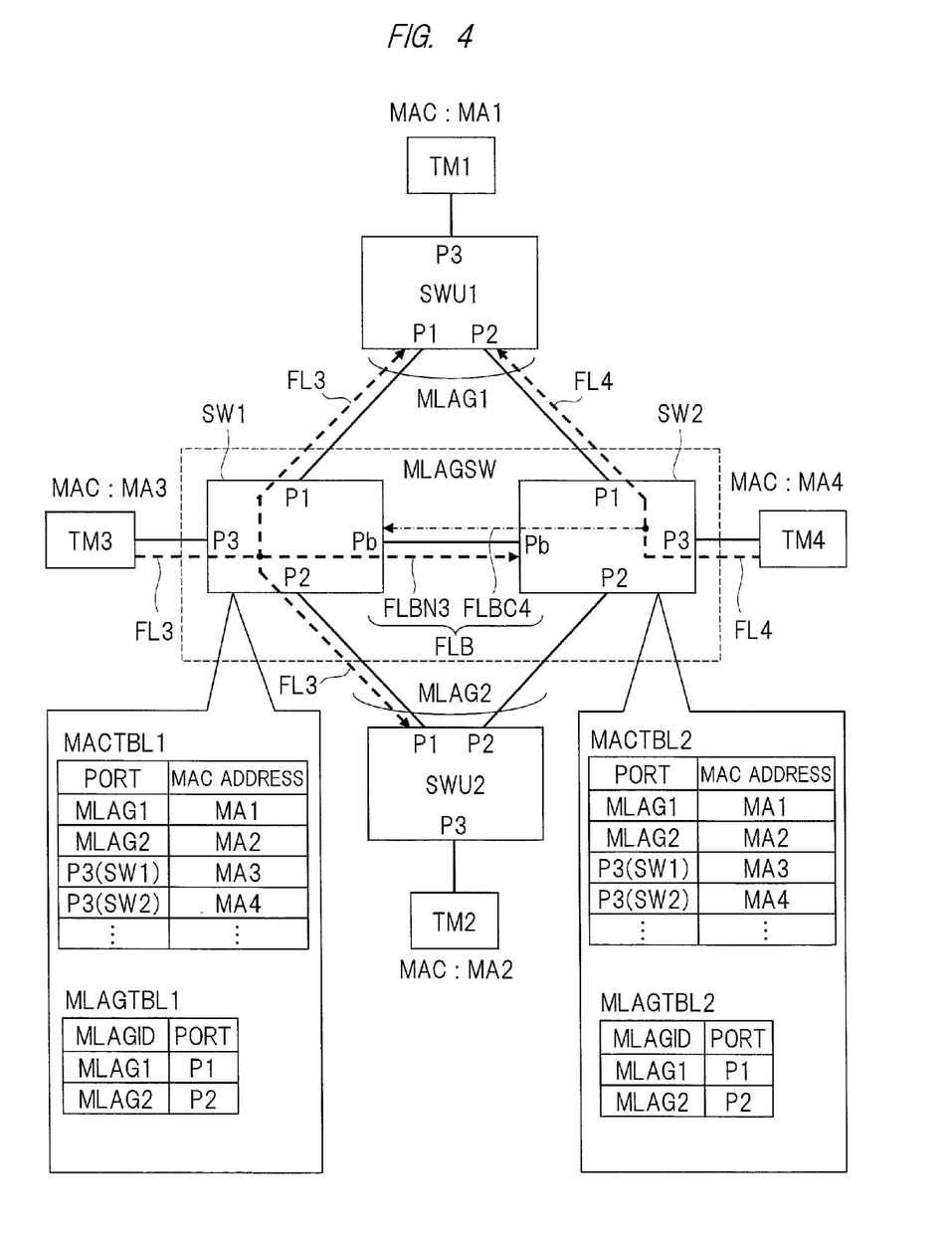
FIG. 4 is a schematic diagram illustrating a configuration example and an operational example in a communication system according to a second embodiment of the present invention.

FIG. 4 is a schematic diagram illustrating a configuration example and an operational example in a communication system according to a second embodiment of the present invention. The communication system of FIG. 4 has the same configuration as that of the communication system of FIG. 1, and performs the operation of the communication system of FIG. 1, and besides, another operation. FIG. 1 illustrates the operational example in the case that the switching devices SW1 and SW2 configuring the MLAGSW receive the frame from the ports of the multi-chassis link aggregation groups MLAG1 and MLAG2. However, FIG. 4 illustrates an operational example in a case that the SW1 and SW2 receive a frame from a port P3 other than those of the MLAG1 and MLAG2.

Although not illustrated in the drawing, in FIG. 4, for example, when a frame directed from the terminal TM3 to the terminal TM2 is transferred by the unicast operation on a communication path via the switching device SW1 and the switching device SWU2, the SW1 and SWU2 learn the MAC address MA3 of the TM3 on their address tables. On the other hand, when a frame directed from the terminal TM2 to the terminal TM3 is transferred to the switching device SW2 side by the multi-chassis link aggregation group MLAG2 of the SWU2, the SW2 causes the flooding operation since the destination MAC address (MA3) of the frame is unknown. Therefore, as similar to the case of FIG. 1, when the SW1 and SW2 receive a frame from the port P3 other than those of the MLAG1 and the MLAG2, it is desired to create the bridging frame regardless of the method of transferring the frame, either the unicast operation or the non-unicast operation.

Accordingly, in FIG. 4, the switching device SW1 receives the frame FL3 at the port P3 from the terminal TM3 having the MAC address MA3, and creates the relay-use bridging frame FLB (FLBN3) when the method of transferring the FL3 is the non-unicast operation (here, the non-unicast operation containing the P1 and P2 as the destination ports), and transfers this from the bridging port Pb. Moreover, the switching device SW2 receives a frame FL4 at the port P3 from a terminal TM4 having a MAC address MA4, creates a learning-use bridging frame FLB (FLBC4) when a method of transferring the FL4 is the unicast operation (here, the unicast operation containing the P1 as the destination port), and transfers this from the port Pb. Regarding the learning-use bridging frame, note that it is desired to limit the communication bandwidth as similar to the case of FIG. 1.

Here, with reference to FIG. 3, the relay-use bridging frame FLB (FLBN3) contains the MA3 as the transmission source MAC address SMAC, the P3 as the identifier for the port which has received, and the second identifier indicating the relaying use as the identifier FT for the frame type. Moreover, the learning-use bridging frame FLB (FLBC4) contains the MA4 as the transmission source MAC address SMAC, the P3 as the identifier for the port which has received, and the first identifier indicating the learning use as the identifier FT for the frame type.

The switching device SW2 which has received the relay-use bridging frame FLB (FLBN3) updates the address table MACTBL2 based on the transmission source MAC address SMAC (MA3) detected from the FLB (FLBN3) and the identifier (P3) for the port which has received. At this time, the SW2 registers, for example, the MA3 in association with the port P3 of the switching device SW1. And, as similar to the case of FIG. 1, the SW2 detects the second identifier from the FLB (FLBN3), and therefore, the FLB (FLBN3) is restored to a normal frame, and is transferred from a predetermined port (here, the P3).

Also, the switching device SW1 which has received the learning-use bridging frame FLB (FLBC4) updates the address table MACTBL1 based on the transmission source MAC address SMAC (MA4) detected from the FLB (FLBC4) and the identifier (P3) of the port which has received. At this time, the SW1 registers, for example, the MA4 in association with the port P3 of the switching device SW2. And, as similar to the case of FIG. 1, the SW1 detects the first identifier from the FLB (FLBC4), and therefore, the FLB (FLBC4) is discarded.

By such an operation, the switching devices SW1 and SW2 can register the relation between each port and the MAC address existing ahead of each port into the address table as the multi-chassis link aggregation device MLAGSW, and can share (synchronize) the address table therebetween. For example, when the SW2 receive the frame directed from the terminal TM2 toward the terminal TM3 via the switching device SWU2, the SW2 recognizes that the destination port is the port P3 of the SW1 based on the address table MACTBL2. In this case, the SW2 creates, for example, a bridging frame obtained by adding the identifier of the destination port to the received frame, and transfers the resulting frame toward the SW1. The SW1 detects the identifier of the destination port from the bridging frame, and transfers the frame from the port P3 after restoring the bridging frame to a normal frame based on the detection.

(Third Embodiment)

In the present third embodiment, principal configuration examples and operational examples of the switching devices SW1 and SW2 (network relay devices) configuring the multi-chassis link aggregation device MLAGSW in the communication systems of the first and second embodiments will be explained.

<<Schematic Configuration of Switching Device (Network Relay Device)>>

Figure 5A:
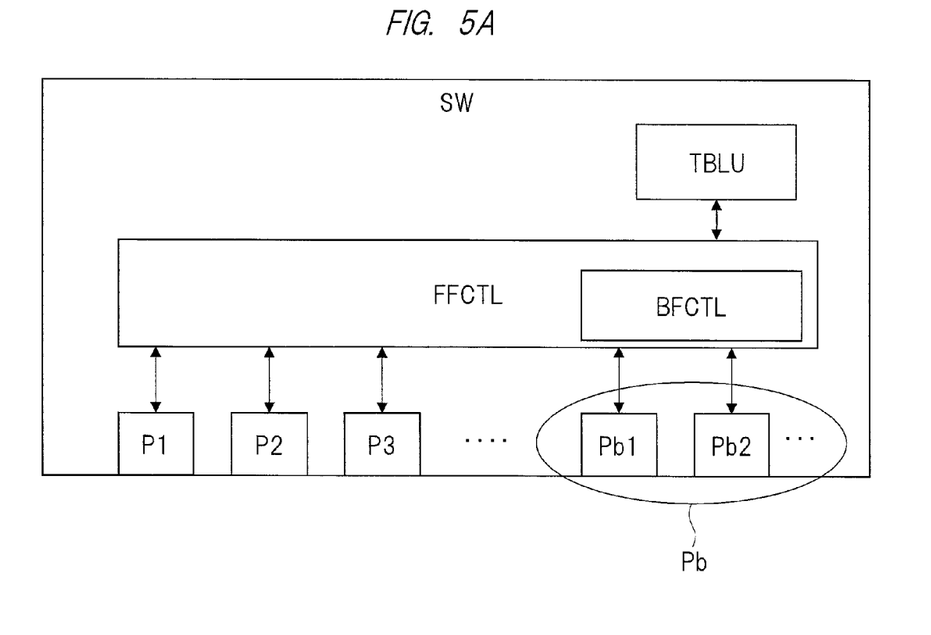
FIG. 5A is a block diagram illustrating a schematic configuration example of a principal part in a network relay device according to a third embodiment of the present invention.
Figure 5B:
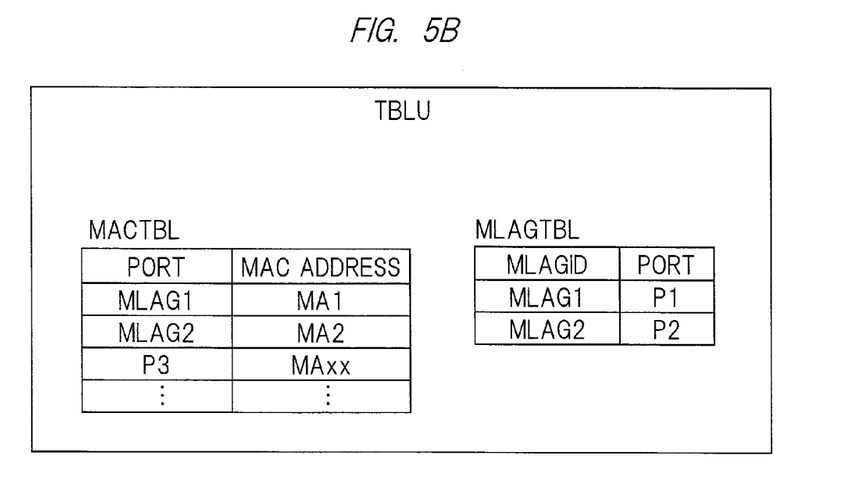
FIG. 5B is a schematic diagram illustrating a configuration example of a table unit in FIG. 5A.

FIG. 5A is a block diagram illustrating a schematic configuration example of a principal part in a network relay device according to the third embodiment of the present invention, and FIG. 5B is a schematic diagram illustrating a configuration example of a table unit in FIG. 5A. The switching device (network relay device) SW illustrated in FIG. 5A is provided with, for example, a frame transfer control unit FFCTL, a table unit TBLU, and a plurality of ports (P1, P2, P3, ..., Pb1, Pb2, ..., etc.). The Pb1, Pb2, ..., etc. among them configure the bridging port Pb as described in the first embodiment, and the link aggregation is set for the PM, Pb2, ..., etc.

For example, when the switching device SW1 of FIG. 1 is exemplified, the switching devices SWU1 and SWU2 are connected to the ports P1 and P2 via the communication lines, respectively, and the terminal TM3 is connected to the port P3 via the communication line. Moreover, to the bridging port Pb, the switching device SW2 is connected via the communication line (bridging communication line). In the table unit TBLU, the link table MLAGTBL and the address table MACTBL are maintained as described in FIG. 1 or others.

The frame transfer control unit FFCTL includes a bridging frame processing unit BFCTL. The FFCTL architects a communication path used for transferring a frame between the respective ports (P1, P2, P3, ..., and Pb) based on the table unit TBLU, and updates the address table MACTBL based on the received frame, and performs others. At this time, the BFCTL creates the bridging frame FLB as illustrated in FIG. 3, analyses the bridging frame FLB received from the bridging port Pb, and performs others.

<<Operation of Switching Device (Network Relay Device)>>

Figure 6:
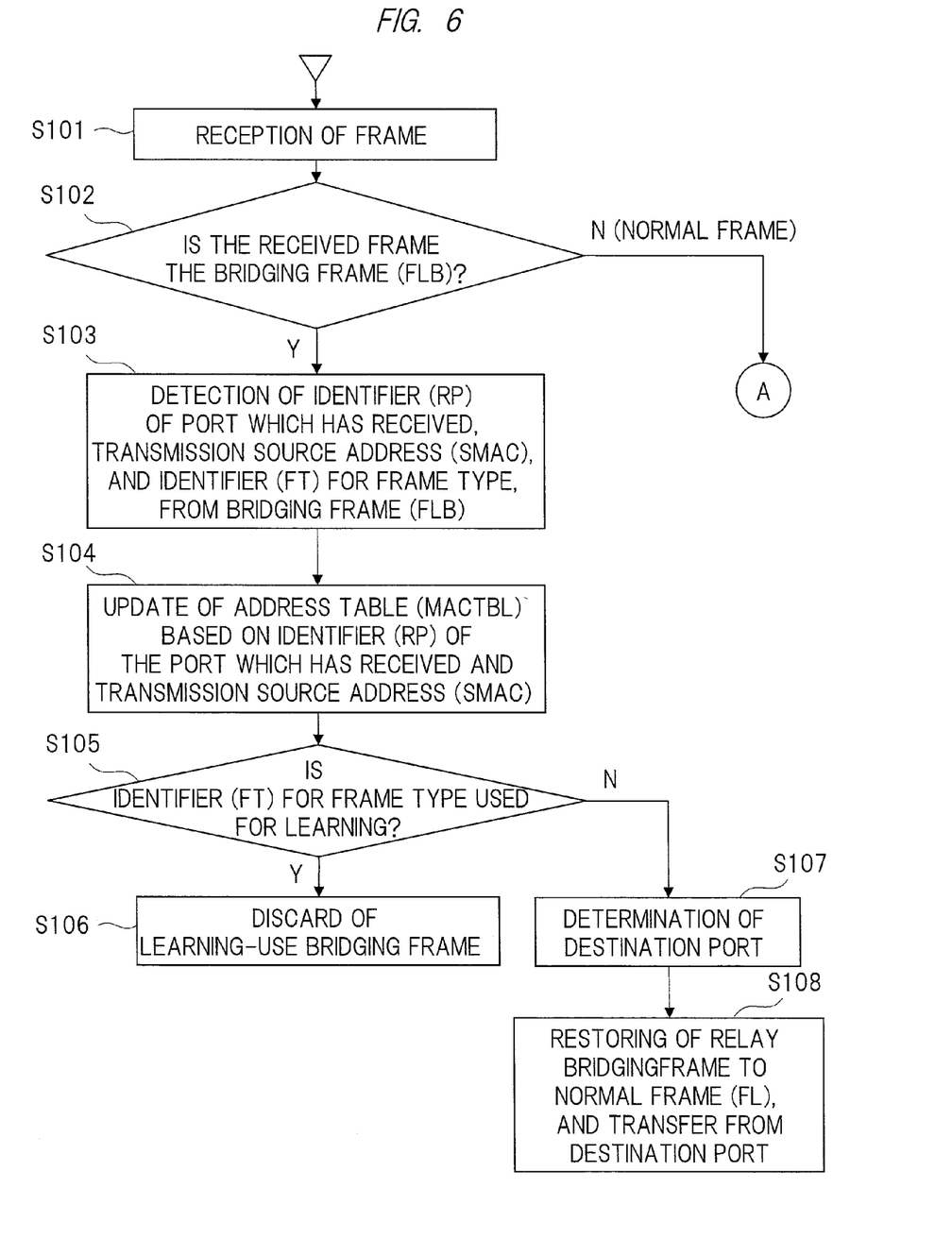
FIG. 6 is a flowchart illustrating a principal operational example of a network relay device of FIGS. 5A and 5B.
Figure 7:
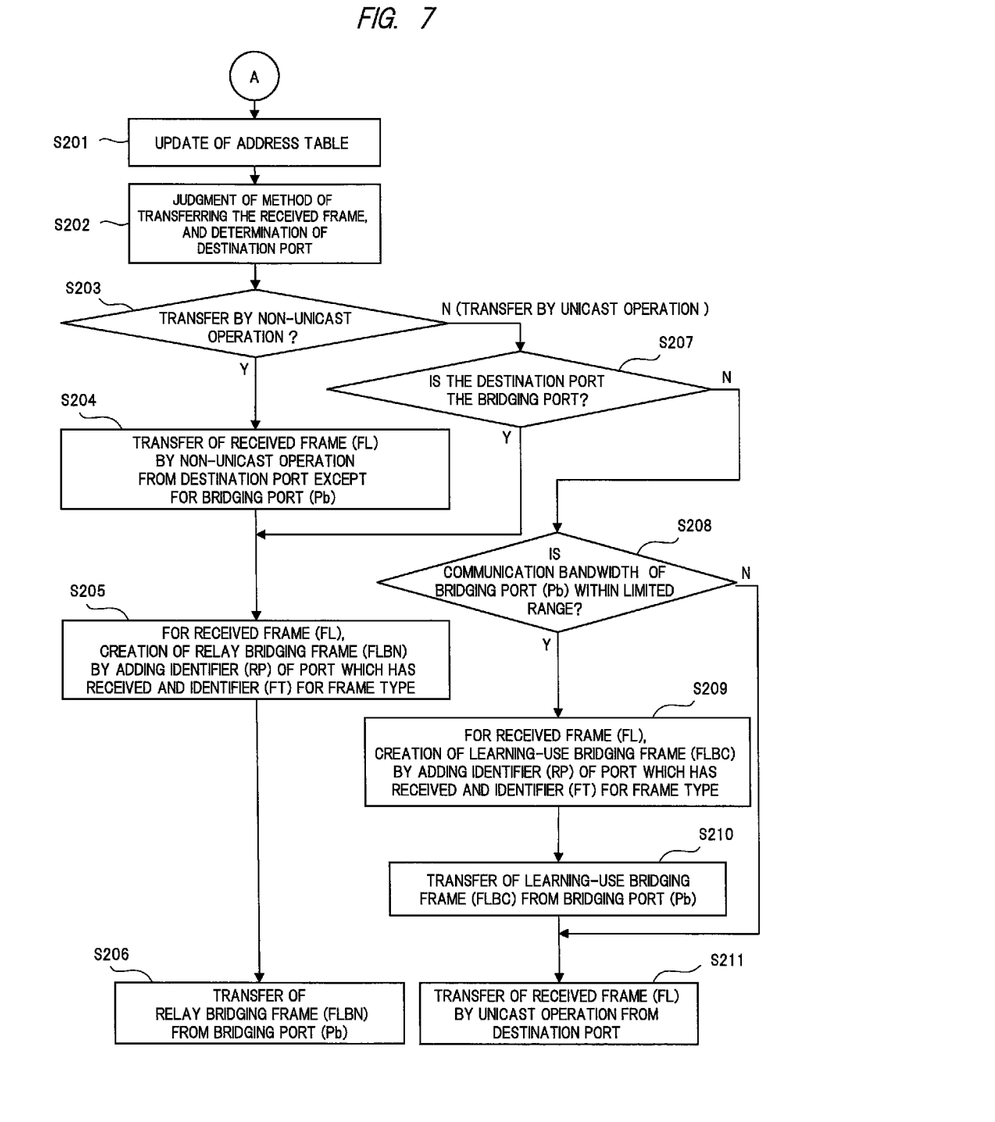
FIG. 7 is a flowchart illustrating the principal operational example continued from FIG. 6.

FIG. 6 is a flowchart illustrating a principal operational example of the network relay device of FIGS. 5A and 5B, and FIG. 7 is a flowchart illustrating the principal operational example continued from FIG. 6. In FIG. 6, first, the frame transfer control unit FFCTL receives a frame from the plurality of ports (P1, P2, P3, ..., and Pb) (step S101). Next, the FFCTL determines whether or not the received frame is the bridging frame FLB (step S102). That is, the FFCTL determines whether or not the port which has received is the bridging port Pb.

Here, in the step S102, a case that the received frame is not the bridging frame FLB will be explained by using FIG. 7. In FIG. 7, first, the frame transfer control unit FFCTL updates the address table MACTBL based on the relation between the transmission source MAC address SMAC in the received frame and the port which has received the frame (step S201). At this time, the FFCTL refers to the link table MLAGTBL, and, if the port which has received is the port for which the multi-chassis link aggregation group MLAG has been set, the FFCTL updates the MACTBL as the port of the MLAG.

Next, the frame transfer control unit FFCTL determines the destination port of the received frame based on the address table MACTBL, and judges the method of transferring the received frame (step S202). That is, if, for example, the destination MAC address DMAC in the received frame exists in the MACTBL, the FFCTL judges the transferring method as the unicast operation. If it does not exist in the MACTBL, the FFCTL judges the transferring method as the non-unicast operation. Note that, if, for example, the received frame is a frame previously specified as the board cast operation, all the DMAC become '1', and therefore, the FFCTL judges the transferring method as the non-unicast operation.

Subsequently, the frame transfer control unit FFCTL executes a step S204 if the judged result in the step S202 is the non-unicast operation, or executes a step S207 if it is the unicast operation. In the step S204, the FFCTL transfers the received frame FL by the non-unicast operation from the destination ports from which the bridging port Pb is excluded (for example, all the ports from which the Pb and the port which has received are excluded). Next, the FFCTL (bridging frame processing unit BFCTL) adds the identifier RP of the port which has received and the identifier FT (here, a relay-use second identifier) for the frame type to the received frame FL so as to create the relay-use bridging frame FLBN (step S205). Then, the FFCTL transfers the relay-use bridging frame FLBN from the bridging port Pb (step S206).

Meanwhile, in the step S207, the frame transfer control unit FFCTL judges whether or not the destination port is the bridging port Pb. That is, for example, in FIG. 1, it identifies a frame to be transferred by the unicast operation from the terminal TM3 toward the terminal TM4 on such a communication path as "SW1→SW2" and a frame to be transferred by the unicast operation from the terminal TM1 toward the terminal TM3 on such a communication path as "SWU1→SW2→SW1". If the destination port is the Pb, the FFCTL performs the processes of the above-described steps S205 and S206. However, in this step S205, as described in second embodiment, the FFCTL may further add an identifier for the destination port to the received frame.

Moreover, in the step S207, if the method of transferring the received frame is the unicast operation, and besides, if the destination port is not the bridging port Pb, the frame transfer control unit FFCTL judges whether or not the communication bandwidth of the Pb is within the limited range (step S208). If the communication bandwidth of the Pb is within the limited range, the FFCTL (bridging frame processing unit BFCTL) adds the identifier RP of the port which has received and the identifier FT (here, the learning-use first identifier) for the frame type to the received frame FL so as to create the learning-use bridging frame FLBC (step S209). And, the FFCTL transfers the learning-use bridging frame FLBC from the Pb (step S210). Further, the FFCTL transfers the received frame FL by the unicast operation from the destination port (step S211). If the communication bandwidth of the Pb exceeds the limited range in the step S208, note that the FFCTL does not creates the learning-use bridging frame but executes a step S211.

Meanwhile, in the step S102 of FIG. 6, if the received frame is the bridging frame FLB, the frame transfer control unit FFCTL (bridging frame processing unit BFCTL) detects, from the FLB, the identifier RP of the port which has received, the transmission source MAC address SMAC, and the identifier FT for the frame type (step S103). Subsequently, the FFCTL updates the address table MACTBL based on the identifier RP of the port which has received and the transmission source MAC address SMAC (step S104). Next, the frame transfer control unit FFCTL judges whether or not the identifier FT for the frame type is used for the learning (that is, the first identifier) (step S105).

In the step S105, if the identifier FT for the frame type is used for the learning (that is, the first identifier), the FFCTL discards the learning-use bridging frame FLBC (step S106). In the step S105, if the identifier FT is not used for the learning (that is, the relay-use second identifier), the FFCTL determines an destination port used for transferring the relay-use bridging frame FLBN (step S107). At this time, if, for example, the identifier for the destination port is added to the FLBN as explained in the flowchart from the step S207 toward the step S205, the FFCTL detects the identifier of the destination port by using the bridging frame processing unit BFCTL, and determines the destination port based on this. Moreover, if the destination port is unknown, the FFCTL determines a port other than the bridging port Pb and the ports of the multi-chassis link aggregation group MLAG as the destination port. Then, the FFCTL restores the FLBN to the normal frame FL, and transfers this from the destination port (step S108).

In the foregoing, the invention made by the inventors has been concretely described based on the embodiments. However, the present invention is not limited to the foregoing embodiments and various modifications and alterations can be made within the scope of the present invention. For example, the above-described embodiments have been explained in detail in order to easily understand the present invention, and are not always limited to the one provided with all explained configurations. Also, a part of the configuration of one embodiment can be replaced by the configuration of another embodiment, and the configuration of another embodiment can be also added to the configuration of one embodiment. Further, a part of the configuration of each embodiment can be added to/eliminated from/replaced by another configuration.

For example, in each embodiment described above, a switching device (network relay device) in a layer 2 (L2) level has been mainly exemplified for the explanation. However, obviously, the present invention may be similarly applied even to a switching device (network relay device) in a layer 3 (L3) level.

What is claimed is:
1. A communication system comprising:
a first switching device and a second switching device each having a plurality of ports including a bridging port and a first port, and being connected to each other by a communication line via the bridging port; and
a third switching device being connected to the first port of the first switching device and the first port of the second switching device via different communication lines, and setting link aggregation for ports to be connection sources of the communication lines,
wherein each of the first switching device and the second switching device has:
an address table indicating a relation between the plurality of ports owned by the first switching device and the second switching device and addresses existing ahead of the plurality of ports; and
a link table by which the first port of the first switching device and the first port of the second switching device logically function as one port,
when the first switching device receives a frame at the first port, the first switching device creates a bridging frame containing a transmission source address contained in the received frame and an identifier of the first port, and transfers the bridging frame from the bridging port toward the second switching device,
when the second switching device receives the bridging frame at the bridging port, the second switching device detects the identifier of the first port and the transmission source address from the bridging frame, and updates the address table of the second switching device based on the identifier of the first port and the transmission source address,
wherein, when the first port receives a first frame from a unicast transmission, the first switching device creates the bridging frame containing a first identifier in addition to the transmission source address and the identifier of the first port,
when the second switching device detects the first identifier from the bridging frame received at the bridging port, the second switching device updates the address table and discards the bridging frame,
wherein, when the first port receives a second frame from a non-unicast transmission, the first switching device creates a third frame as the bridging frame and transfers the bridging frame from the bridging port, the third frame being obtained by further adding a second identifier to the second frame in addition to the identifier of the first port, and
when the second switching device detects the second identifier from the bridging frame received at the bridging port, the second switching device updates the address table and restores the bridging frame to a normal frame, and then, transfers the normal frame from a predetermined port.

2. The communication system according to claim 1,
wherein, when the method of transferring the frame received at the first port is the unicast operation, and besides, when a limited range of a communication bandwidth set for the bridging port is satisfied, the first switching device transfers the bridging frame from the bridging port.

3. A network relay device comprising:
a plurality of ports including a first port and a bridging port to be connected to another network relay device different from the network relay device via a communication line;
an address table indicating a relation between the plurality of ports and addresses existing ahead of the plurality of ports; and
a link table by which the first port of the network relay device and a first port of the another network relay device logically function as one port,
wherein, when the first port receives a frame, a bridging frame containing a transmission source address contained in the received frame and an identifier of the port which has received is created, and the bridging frame is transferred from the bridging port to the another network relay device,
when the bridging frame is received from the another network relay device via the bridging port, an identifier of the port which has received and the transmission source address are detected from the bridging frame, and the address table is updated based on the identifier of the port which has received and the transmission source address,
wherein, when the first port receives a first frame from a unicast transmission, the bridging frame, containing a first identifier in addition to the transmission source address and the identifier of the port which has received the first frame, is created,
when the first identifier is detected from the bridging frame received at the bridging port, the address table is updated, and the bridging frame is discarded,
wherein, when the first port receives a second frame from a non-unicast transmission, a third frame is created as the bridging frame, and the bridging frame is transferred from the bridging port, the third frame being obtained by further adding a second identifier to the second frame in addition to the identifier of the first port, and
when the second identifier is detected from the bridging frame received at the bridging port, the address table is updated, and the bridging frame is restored to a normal frame, and then, the normal frame is transferred from a predetermined port.

4. The network relay device according to claim 1,
wherein, when the method of transferring the frame received at the first port is the unicast operation, and besides, when a limited range of a communication bandwidth set for the bridging port is satisfied, the bridging frame is transferred from the bridging port.

* * * * *